US009581485B2

(12) United States Patent
Haynes et al.

(10) Patent No.: US 9,581,485 B2
(45) Date of Patent: Feb. 28, 2017

(54) REMOVABLE MAGNETOSTRICTIVE PROBE WITH AUTOMATIC CALIBRATION

(71) Applicant: Magnetrol International, Incorporated, Aurora, IL (US)

(72) Inventors: Kevin M. Haynes, Lombard, IL (US); James M. Berry, LaGrange, IL (US); Eric C. Moore, Lake in the Hills, IL (US)

(73) Assignee: Magnetrol International, Incorporated, Aurora, IL (US)

( * ) Notice: Subject to any disclaimer, the term of this patent is extended or adjusted under 35 U.S.C. 154(b) by 241 days.

(21) Appl. No.: 14/452,921

(22) Filed: Aug. 6, 2014

(65) Prior Publication Data

US 2016/0041025 A1 Feb. 11, 2016

(51) Int. Cl.
  *G01F 23/72* (2006.01)
  *G01F 25/00* (2006.01)
  *G01F 23/296* (2006.01)

(52) U.S. Cl.
  CPC .......... *G01F 23/72* (2013.01); *G01F 23/2963* (2013.01); *G01F 25/0061* (2013.01)

(58) Field of Classification Search
  CPC .. G01F 23/2963; G01F 25/0061; G01F 23/72; G01D 5/485
  See application file for complete search history.

(56) References Cited

U.S. PATENT DOCUMENTS

| 5,038,305 | A |   | 8/1991  | Kumar et al. |
|-----------|----|---|---------|--------------|
| 5,156,047 | A | * | 10/1992 | Tuma ...................... G01F 23/24 340/620 |
| 5,406,200 | A |   | 4/1995  | Begin et al. |
| 6,266,551 | B1 |  | 7/2001  | Osadchy et al. |
| 7,031,865 | B2 |  | 4/2006  | Bathurst et al. |
| 8,218,396 | B2 |  | 7/2012  | Holcomb et al. |
| 9,046,392 | B2 | * | 6/2015  | Wangler ............... G01D 11/245 |
| 2008/0061772 | A1 | * | 3/2008 | Janitch ................ G01F 23/2963 324/207.26 |
| 2008/0098810 | A1 | * | 5/2008 | Skinner .................... G01F 23/72 73/323 |
| 2014/0125512 | A1 | * | 5/2014 | Janitch .................. G01F 23/284 342/124 |

FOREIGN PATENT DOCUMENTS

IT   WO 2010092604 A1 *  8/2010  ............. G01D 5/485

* cited by examiner

*Primary Examiner* — Daniel J Colilla

(74) *Attorney, Agent, or Firm* — Wood, Phillips, Katz, Clark & Mortimer

(57) ABSTRACT

A magnetostrictive sensing instrument comprises a probe including a tube having a near end and a distal end. A magnetostrictive wire is in the tube. An adaptor at the tube near end includes a probe circuit comprising a drive circuit for the magnetostrictive wire, a pickup sensor, a preamplifier and a memory circuit storing calibration parameters for the probe. An instrument housing includes a control circuit. A connector is operatively disposed between the instrument housing and the adaptor and comprises electrical conductors for connecting the control circuit to the probe circuit.

20 Claims, 7 Drawing Sheets

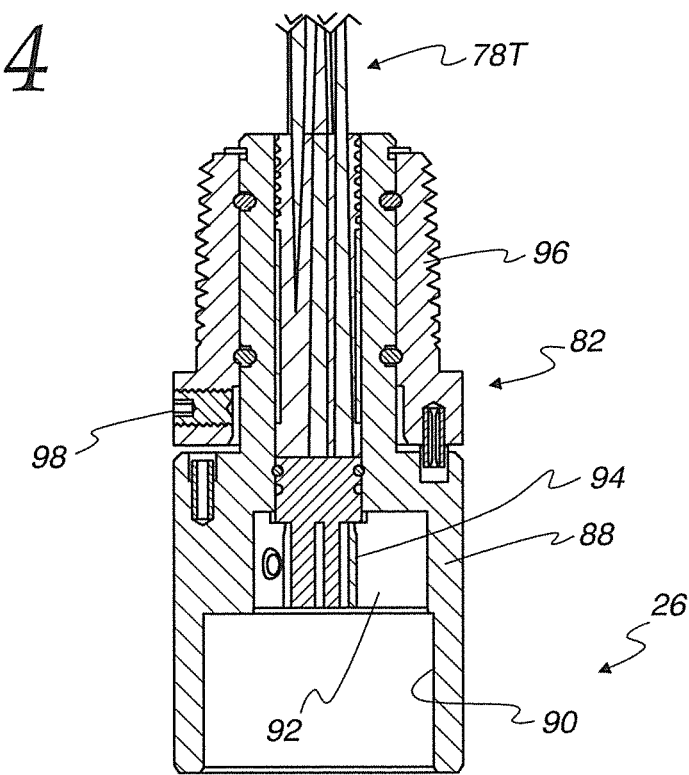
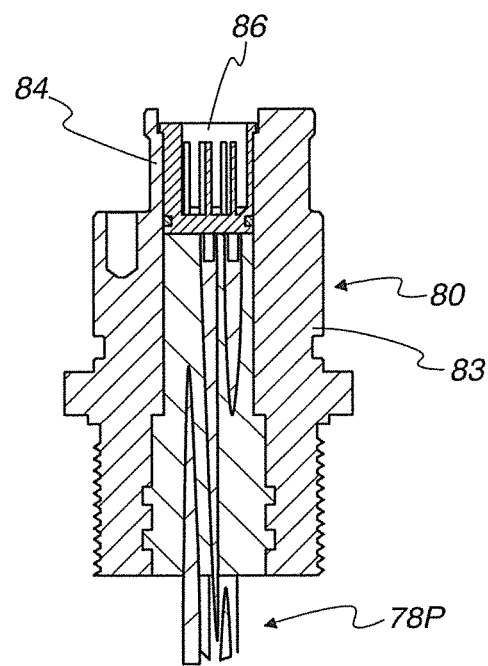
Fig. 4

REMOVABLE MAGNETOSTRICTIVE PROBE WITH AUTOMATIC CALIBRATION

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to process control instruments, and more particularly, to a magnetostrictive transmitter including a removable probe and with automatic calibration.

BACKGROUND

Process control systems require the accurate measurement of process variables. Typically, a primary element senses the value of a process variable and a transmitter develops an output having a value that varies as a function of the process variable. For example, a level transmitter includes a primary element for sensing level and a circuit for developing an electrical signal proportional to or representing sensed level.

Knowledge of level in industrial process tanks or vessels has long been required for safe and cost-effective operation of plants. Many technologies exist for making level measurements. These include magnetostrictive, capacitance, ultrasonic and microwave radar, to name a few.

One form of process instrument is of the intrusive type in which the primary element is in direct contact with the process fluid for sensing level. A magnetostrictive transmitter is an example of an intrusive type level measurement instrument. A magnetostrictive transmitter has a probe including a magnetostrictive wire maintained under tension in a tube. The probe extends into the process vessel. A magnetic float is movable proximate the probe and floats atop the fluid in the vessel. An electrical pulse is transmitted on the magnetostrictive wire. The electrical pulse interacts with the magnetic field of the float, which creates a torque on the wire to produce a torsional force on the wire, thus initiating a torsional wave that propagates along the wire at the speed of sound. This is known as the Wiedemann effect. Typically, a pickup sensor is positioned at one end of the wire to sense the torsional wave on the wire. The elapsed time is measured between the launch of the electrical pulse and the signal from the pickup sensor. The distance between the magnet and the pickup sensor is calculated from the measured elapsed time multiplied by the speed of the torsional wave, representing level.

The signal from the pickup sensor is a relatively low level signal. Thus, the transmitter must generally be mounted as close as possible to the probe. Typically, the probe is an integral component of the magnetostrictive transmitter and they are assembled and tested together during manufacturing.

Advantageously, the transmitter would be removable from the probe and also be remote mountable. In fact, it would be advantageous to replace a transmitter, if necessary, without removing the probe from the process vessel. However, the flexibility to remove the transmitter from the probe runs the risk that calibration of the system will be corrupted when the transmitter is not placed on the probe for which it was originally calibrated. The calibration is typically stored in the transmitter and accounts for variations in the performance of the probe. When the probe and the transmitter are always inseparable, calibration is not an issue. Allowing the transmitter to be removed from the probe runs the risk of poor performance because of the incorrect calibration.

The performance of the system is also dependent on how far the transmitter's amplifiers are separated from the pickup sensor of the probe. The magnetostrictive sensor generates very small signals that can be corrupted by electromagnetic interference. This issue is made worse by spacing the circuitry further from the pickup sensor.

This application is directed to improvements which allow a transmitter to be removable and/or remote mountable.

SUMMARY

As disclosed herein, a magnetostrictive probe is removable from a magnetostrictive transmitter and is provided with automatic calibration.

As also disclosed herein, the magnetostrictive transmitter can be remotely mounted relative to magnetostrictive probe.

There is disclosed herein, a magnetostrictive sensing instrument comprising a probe including an elongate tube having a near end and a distal end. A magnetostrictive wire is in the tube. An adaptor at the tube near end includes a probe circuit comprising a drive circuit for the magnetostrictive wire, a pickup sensor and a preamplifier circuit. An instrument housing includes a control circuit. A connector is operatively disposed between the instrument housing and the adaptor and comprises electrical conductors for connecting the control circuit to the probe circuit.

It is a feature that interaction between an electrical pulse on the magnetostrictive wire from the drive circuit and a magnetic field produces a torsional wave on the magnetostrictive wire sensed by the pickup sensor. The preamplifier circuit amplifies a signal from the pickup sensor for transmission to the control circuit.

It is another feature that the probe circuit comprises a memory circuit storing calibration parameters for the probe.

It is still a further feature that the connector comprises an elongate conduit for remotely mounting the instrument housing relative to the probe.

It is another feature that the connector comprises a removable connector for removing the instrument housing from the probe.

It is an additional feature that the preamplifier circuit amplifies and filters a signal from the pickup sensor.

It is a further feature that the control circuit is operable to determine if the probe is connected to the control circuit.

There is also disclosed herein a magnetostrictive sensing instrument comprising a probe including a tube having a near end and a distal end. A magnetostrictive wire is in the tube. An adaptor at the tube near end includes a probe circuit comprising a drive circuit for the magnetostrictive wire, a pickup sensor and a memory circuit storing calibration parameters for the probe. An instrument housing includes a control circuit. A connector is operatively disposed between the instrument housing and the adaptor and comprises electrical conductors for connecting the control circuit to the probe circuit.

It is a feature that the control circuit is operable to read calibration parameters from the memory.

It is another feature that the probe connector comprises a removable connector for removing the instrument housing from the probe.

It is a further feature that interaction between an electrical pulse on the magnetostrictive wire from the drive circuit and a magnetic field produces a torsional wave on the magnetostrictive wire sensed by the pickup sensor and the calibration parameters are used for analyzing the torsional wave.

It is yet another feature that the control circuit is operable to determine if the probe comprises a new probe and responsive thereto reads calibration parameters from the memory.

It is yet an additional feature that the memory circuit is write protected.

There is also disclosed herein a method of calibrating a magnetostrictive sensing instrument comprising: providing a probe including an elongate tube having a near end and a distal end, a magnetostrictive wire in the tube, and an adapter at the tube near end including a transceiver circuit comprising a drive circuit for the magnetostrictive wire, a pickup sensor and a memory circuit storing calibration parameters for the probe; providing an instrument housing including a programmed controller; operatively connecting the instrument housing to the adapter for connecting the controller to the transceiver circuit; and the controller reading the calibration parameters from the memory circuit and subsequently using the calibration parameters during normal measurement operations.

Other features and advantages will be apparent from a review of the entire specification, including the appended claims and drawings.

BRIEF DESCRIPTION OF THE DRAWINGS

FIG. 4 is an exploded, sectional view illustrating the probe connector;

DETAILED DESCRIPTION

Figure 1:
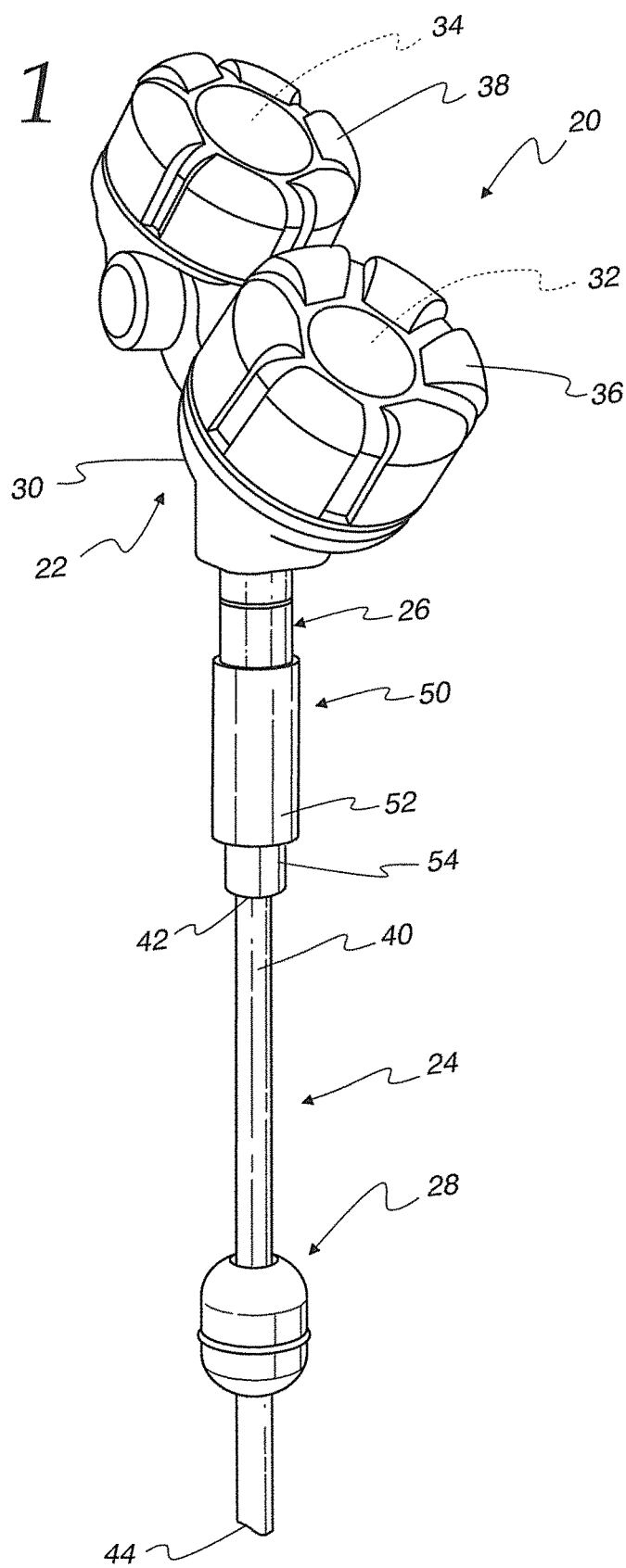
FIG. 1 is a perspective view of a magnetostrictive instrument with a removable and/or remote mountable probe.

Referring to FIG. 1, a magnetostrictive level sensing instrument 20 is illustrated. As is conventional, the instrument 20 is operable to sense level of a material, such as a fluid in a process vessel, and transmit an electrical signal indicative of the level to control instrumentation.

The instrument 20 includes a transmitter 22 and a probe 24 connected by a swivel connector 26. A magnetic float 28 is receivable on the probe 24. The transmitter 22 includes a control housing 30. The housing 30 comprises a dual compartment instrument housing as described in Mulrooney et al. U.S. Pat. No. 6,062,905, the specification of which is incorporated by reference herein. The housing 30 defines an electronics compartment 32 and a wiring compartment 34. The compartments 32 and 34 are selectively closed by respective covers 36 and 38. The electronics compartment 32 houses a sensing circuit, described below, for determining level and generating an electrical signal representing level for transmission to other control instruments, as is well known.

The float 28 comprises a conventional magnetic float, including internal magnets, not shown. The float 28 is captured on the probe 24. As is known, the magnetic float 28 floats atop the material the level of which is being sensed and creates a magnetic field representative of the location of the top surface of the fluid or other material. As is apparent, the float 28 could be replaced by another type of magnetic device for more generally sensing position of the magnet. Thus, the sensing instrument 20 could alternatively sense position rather than level.

Figure 2:
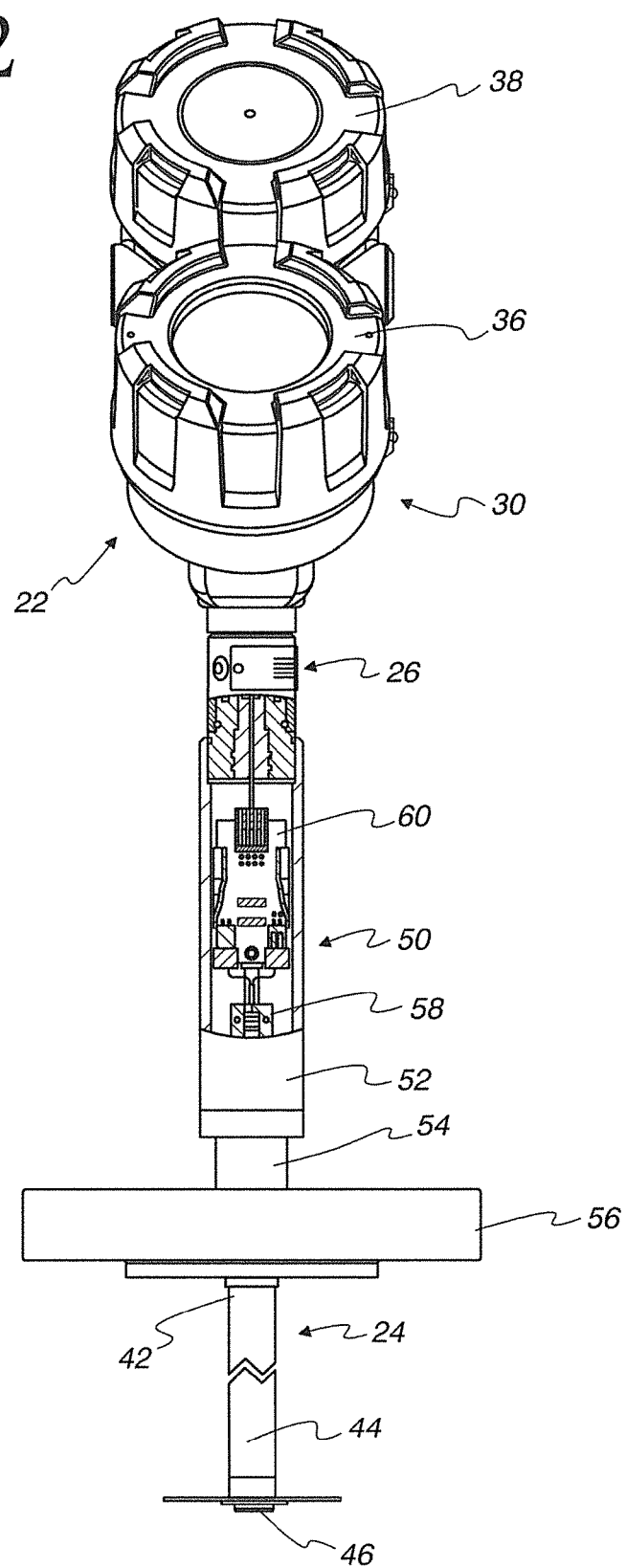
FIG. 2 is a partial sectional view of the magnetostrictive instrument of FIG. 1 with an adaptor and probe connector illustrated partially in section.

The probe 24 comprises an elongate stainless steel tube 40 having a near end 42 and a distal end 44. The distal end 44 is closed by an end cap 46, see FIG. 2. An adaptor 50 is mounted at the tube near end 42. The adaptor 50 comprises a cylindrical housing 52 extending upwardly from a threaded sleeve 54. The threaded sleeve 54 is for connecting the probe 24 to an opening in a process vessel (not shown). Alternatively, the threaded sleeve 54 may connect to a flange 56, see FIG. 2, for connection to a process vessel. The adaptor housing 52 houses a pickup sensor 58 and a probe circuit 60.

Figure 3:
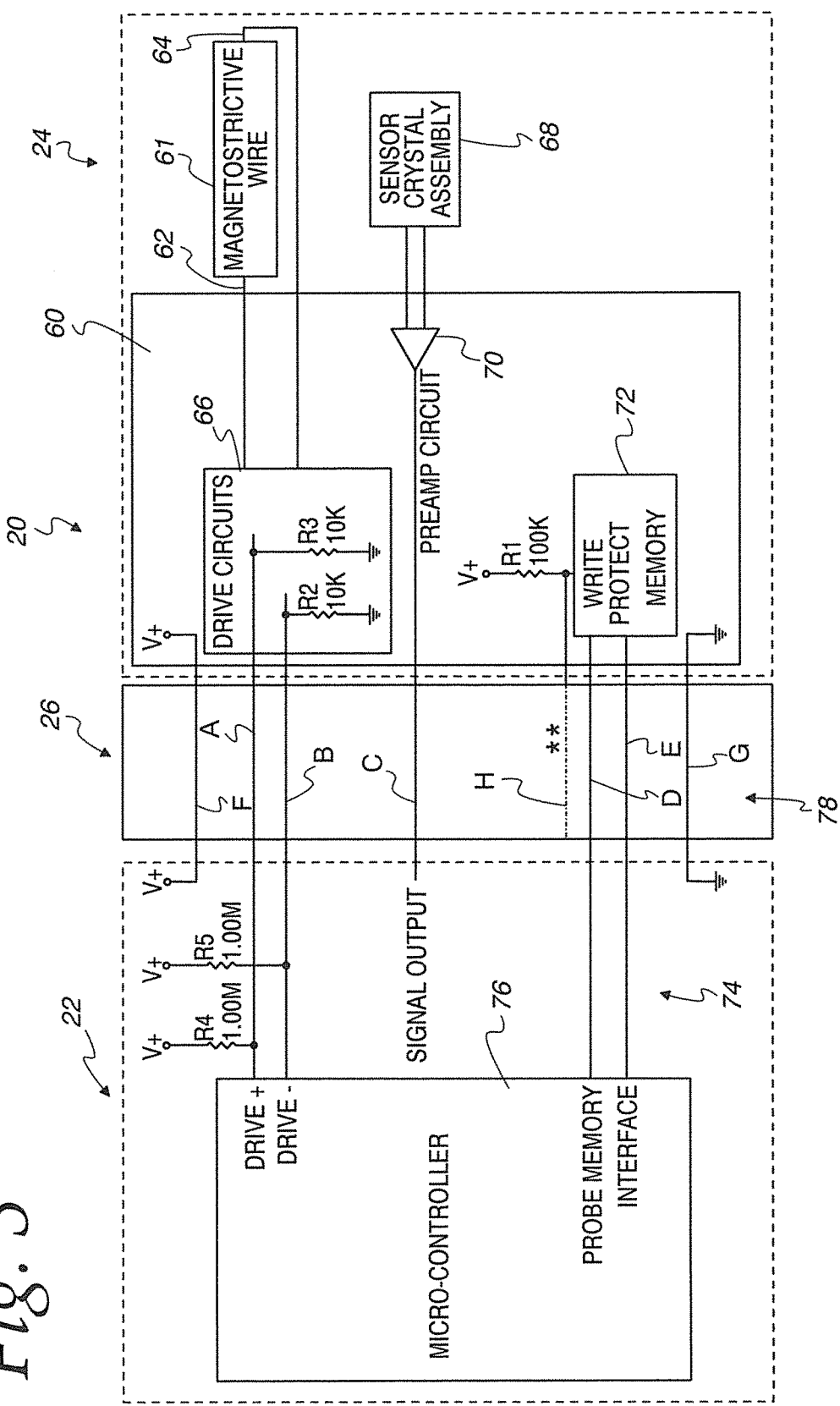
FIG. 3 is an electrical schematic of the instrument of FIG. 1.

Referring also to FIG. 3, the probe 24 has a conventional magnetostrictive wire 61 having a first end 62 and a second end 64. The wire second end 64 is secured to the end cap 46, see FIG. 2, in any known manner. Both ends 62 and 64 of the magnetostrictive wire 61 are connected to a drive circuit 66 of the probe circuit 60. The pickup sensor 58 includes a sensor crystal assembly 68 which is operatively coupled to the magnetostrictive wire 61, in any known manner. For example, the sensor crystal assembly 68 may sandwich the magnetostrictive wire 61 as shown in U.S. Pat. No. 7,466,124, owned by the Assignee of the present application, the specification of which is incorporated by reference herein.

The sensor crystal assembly 68 is electrically connected to a preamplifier circuit 70 of the probe circuit 60. The probe circuit 60 also includes a memory circuit 72. The memory circuit 72 is provided with a write protect function.

The transmitter 22 includes a control circuit 74. The control circuit 74 is connected via the swivel connector 26, as described below, to the probe circuit 60. The control circuit 74 comprises a controller in the form of a programmed microcontroller 76. The microcontroller 76 comprises a programmed processor and associated memory and I/O, such as a keypad and display (not shown), for operating in accordance with a control program to control operation of the instrument 20.

The swivel connector 26 comprises a multiconductor cable 78 including eight connector lines labelled A, B, C, D, E, F, G and H. The swivel connector 26 could be an elongate conduit for remote mounting, or could be a two-part connector, as described below, to remove the transmitter 22 from the probe 24.

The microcontroller 76 includes DRIVE+ and DRIVE− outputs connected via connector lines A and B to the drive circuit 66. A signal output from the preamp circuit 70 is connected via the connector line C to a signal output line of the microcontroller 76. The microcontroller 76 includes probe memory interface ports connected via connector lines D and E to the memory circuit 72. Connector lines F and G are provided for plus voltage and ground, as illustrated. The swivel connector 26 illustrates a dashed line, representing a connector line H, used for a write protect input of the memory circuit 72. This line H is only used during a factory calibration function, as described below, and does not connect to the microcontroller 76.

As is conventional, the microcontroller 76 controls the drive circuit 66 to develop an electrical pulse on the magnetostrictive wire 61. A magnetic field from the float 28 produces a torsional wave on the magnetostrictive wire 61 sensed by the sensor crystal assembly 68. This wave is used by the microcontroller 76 to determine position of the float 28, or more generally, the magnet, representing level when implemented as a level measuring instrument.

As described herein, the transmitter 22 is selectively removable from the probe 24. This is done using the swivel connector 26 which enables the transmitter 22 to be removed from the probe 24, and to be rotated relative to the probe 24. Alternatively, the swivel connector 26 could be implemented in the form of an elongate conduit to allow the transmitter 22 to be remotely mounted relative to the probe 24.

In the illustrated embodiment, the swivel connector 26 is a two-part connector comprising a probe connector 80 and a transmitter connector 82. The probe connector 80 comprises a metal probe connector housing 83 including an offset boss 84 receiving a multi-pin wire connector 86. The multi-pin wire connector 86 is connected to a cable 78P representing the probe side of the electrical cable 78, see FIG. 3.

The transmitter connector 82 comprises a metal transmitter connector housing 88 including a first bore 90 receiving the probe housing 82 and an offset blind bore 92 receiving the offset boss 84. The offset blind bore 92 has a multi-pin wire connector 94 for mating with the probe multi-pin wire connector 86. The multi-pin wire connector 94 is electrically connected to a cable 78T, representing the transmitter side of the cable 78, see FIG. 3. The transmitter connector housing 88 is rotatably received in a swivel 96. The swivel 96 mounts to the control housing 30. A set screw 98 in the swivel 96 maintains the transmitter 22 in a desired orientation during use.

The mechanical design of the swivel connector 26 assures proper alignment of the multi-pin wire connectors 94 and 86 before insertion so that the fragile contacts will not be damaged. The swivel design allows the transmitter 22 to rotate, after the swivel connector 26 has been seated, to position the transmitter 22 easily on the probe 24.

By using the preamplifier circuit 70 in the probe 24, the small sensor signals from the sensor crystal assembly 68 are amplified and filtered in circuitry near the sensor crystal assembly 68. The resulting amplified signals are suitable for longer remote mounting distances.

The memory 72 in the probe circuit allows probe calibration values to be stored in the probe 24. This includes a write protection mechanism so that the probe memory 72 is only written to during factory calibration. During calibration, the write protection is disabled and the probe memory 72 enabled. This prevents calibration from being corrupted.

The use of a memory device 72 with a serial interface helps to reduce the number of contacts required. The memory is large enough to store calibration variables, model number information, calibration date, calibration location, serial number, and other parameters. In this way, every probe 24 is uniquely identified.

The system also allows the transmitter 22 to identify when a probe 24 is not attached or when a new probe 24 has been attached. When a new probe 24 is attached, the controller 76 will read the probe memory 72 and prompt the user that a new probe has been identified. If the user agrees, then the system makes use of the calibration data from the newly attached probe and begins operation.

Figure 5:
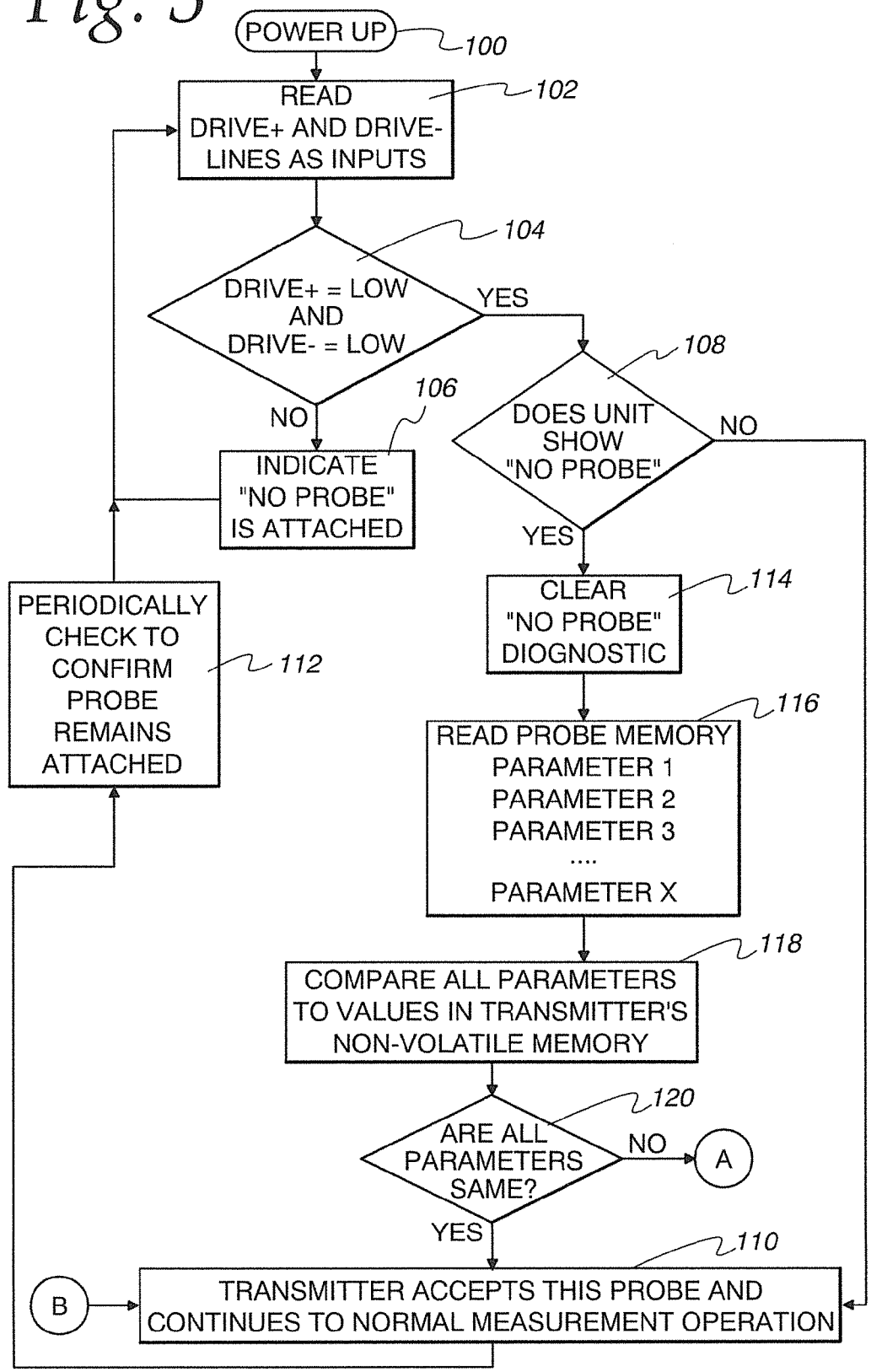
FIGS. 5 and 6 are a flow chart illustrating operation of the magnetostrictive sensing instrument of FIG. 1.
Figure 6:
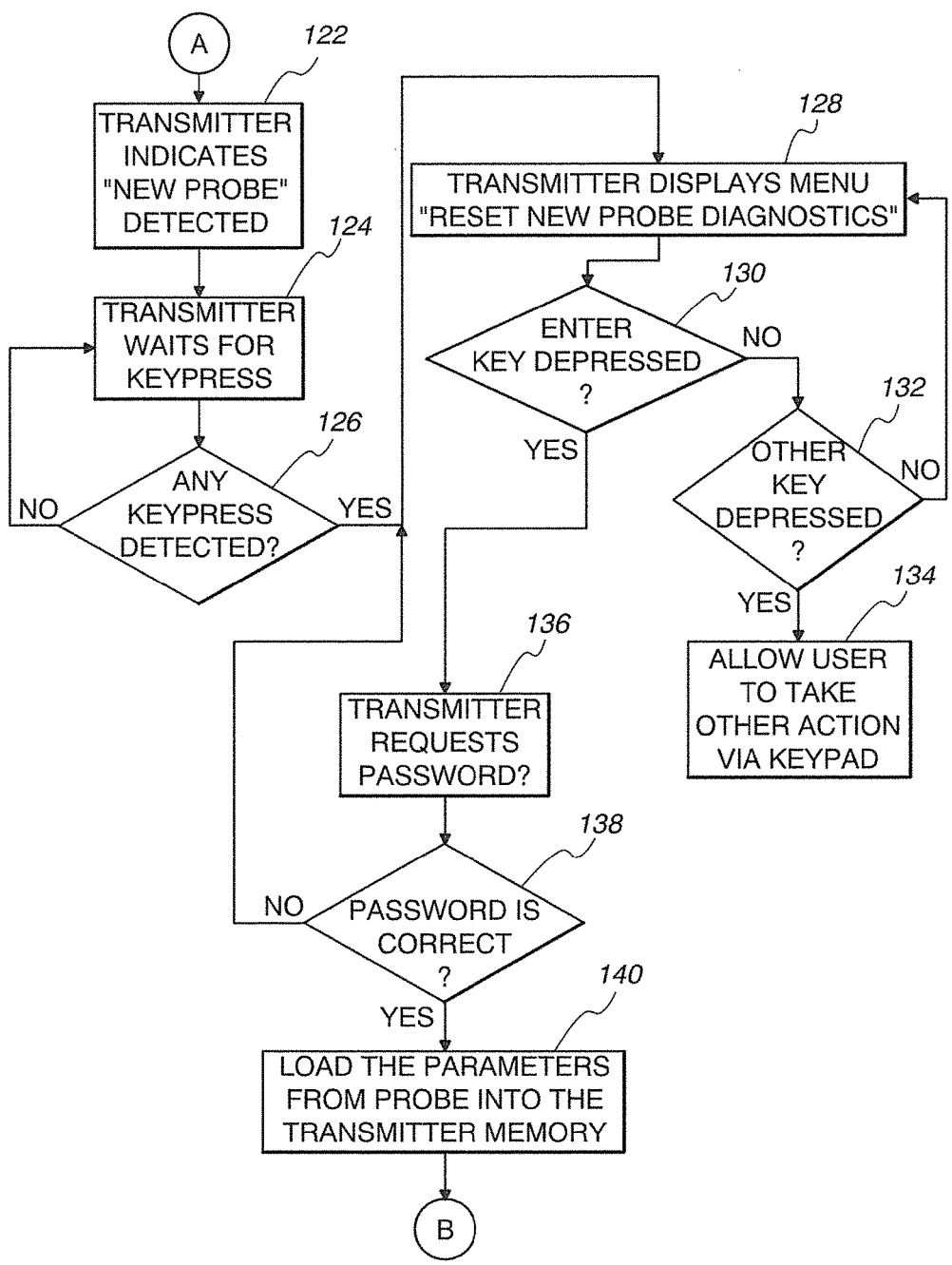

Referring to FIGS. 5 and 6, a flow diagram illustrates software relating to the removable probe functions.

The software begins at a node 100 of FIG. 5 at power up. After conventional initialization, the controller 76 reads the DRIVE+ and DRIVE− lines as inputs at a block 102. A decision block 104 determines if both inputs are low. As is known, if the probe 24 is not attached, then there is an open condition which will result in a high input. If this is the case, then the software stores a diagnostic "no probe" condition at a block 104. Control then loops back to the block 102. If both inputs are low, indicating that the probe is attached, then a decision block 108 determines if the unit memory shows "no probe". This would be the case if on the previous pass through the routine there was no probe attached. In other words, the decision block 108 determines if a probe was previously not attached and now a probe is attached. Under these circumstances, it is necessary to determine if the probe is the same probe that was previously attached or a new probe. If the unit does not show "no probe" at the decision block 108, then the program proceeds to a block 110 which accepts the probe and continues to normal measurement operations. The normal measurement operations comprise the normal routine for determining position of the magnetic float 28, as discussed above. The routine periodically checks to confirm that the probe remains attached at a block 112 as by returning to the block 102.

Returning to the decision block 108, if the unit previously showed "no probe", then a block 114 clears the "no probe" diagnostic. The probe memory 72 is read at a block 116 to read in the various parameters associated with the probe and its calibration function. A block 118 compares all of the parameters from the memory to values in the transmitter's non-volatile memory. If all the parameters are the same, as determined at decision block 120, then the program recognizes that the same probe is now attached and advances to the block 110. If all the parameters are not the same, then the program proceeds via a node A to a block 122 on FIG. 6 as a new probe has been detected.

At the block 122, the transmitter 22 indicates that a new probe is detected and waits for a the user to implement a key press at a block 124 which operates in conjunction with block 126 to determine if any key press has been detected. If not, then the routine moves between the blocks 124 and 126 until a key press is detected at which time the program advances to a block 128 which displays a message to reset new probe diagnostics. A decision block 130 determines if an enter key has been depressed. If not, then a decision block 132 determines if another key has been depressed. If not, then the program moves back to the block 128. If so, then a block 134 allows the user to take other action via the transmitter keypad. This would take the transmitter out of this routine until the other action has been completed. If the enter keypad was depressed, as determined at the decision block 130, then a block 136 requests a user password. A decision block 138 determines if the password is correct. If not, then the program returns to the block 128. If the correct password is entered, then the parameters from the probe memory 72 are entered into the transmitter memory at a block 140. The program then proceeds via the node B to the block 110, see FIG. 5, to continue to normal measurement operation using the new calibration parameters.

As discussed above, the probe memory 72 is write protected. Data can be written to this memory only if the write protect function is disabled, which cannot be done by the transmitter 22. As such, calibration can only be done by securing the probe 24 to an appropriate test fixture. Such a test fixture includes a microcontroller and appropriate programming to test operation of the probe 24 and determine the appropriate calibration parameters necessary to normalize a measured signal.

Figure 7:
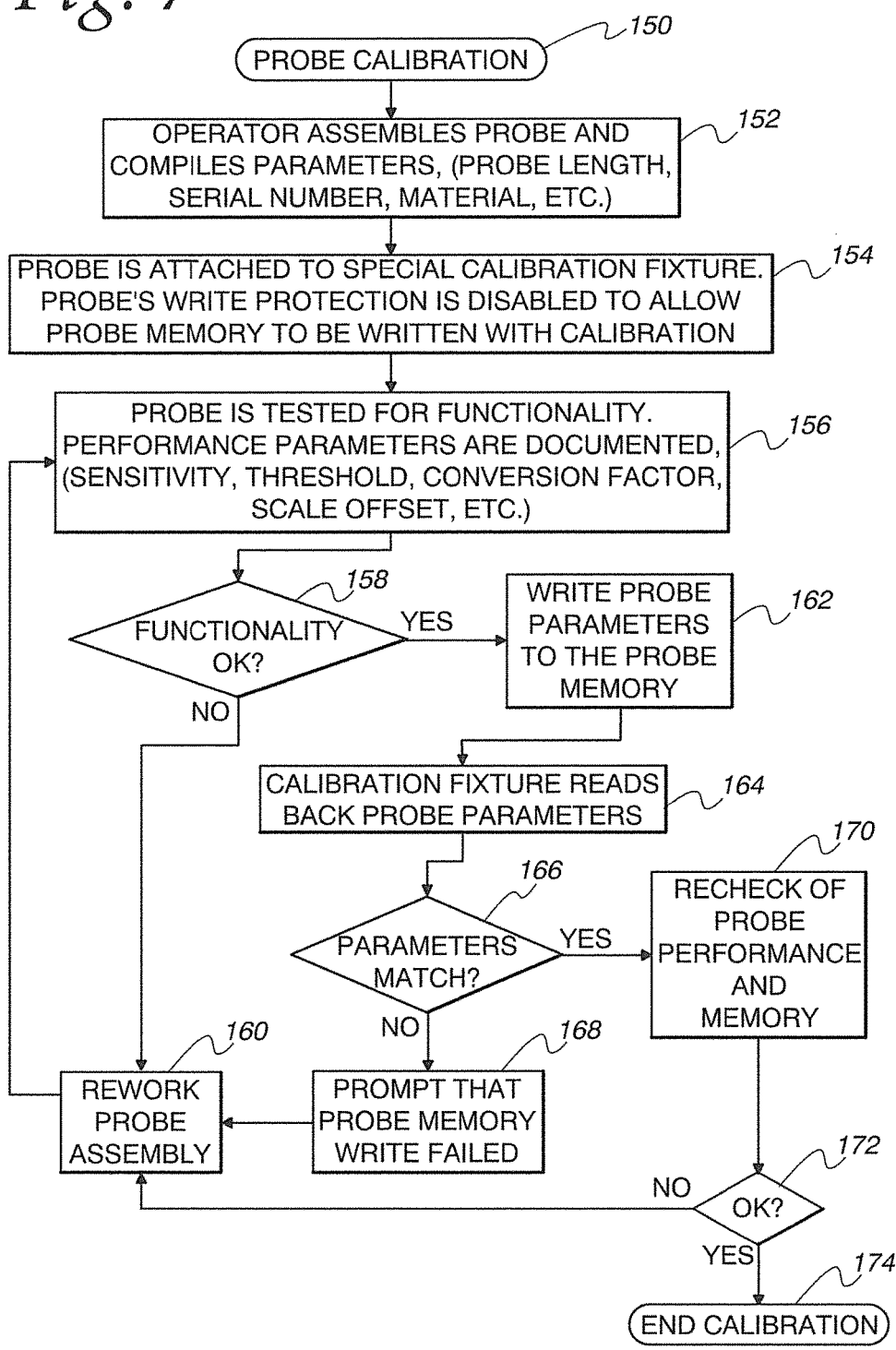
FIG. 7 is a flow diagram illustrating a probe calibration routine for the probe of the instrument of FIG. 1.

The calibration routine is illustrated in FIG. 7 beginning at a node 150. The operator assembles the probe 24 at a block 152 and manually compiles parameters such as probe length, serial number, material being measured and the like. The probe 24 is then attached to the calibration fixture at a block 154. The probe's write protection is disabled via the conductor H, see FIG. 3, to allow the probe memory 72 to be written with calibration parameters. At a block 156, the probe is tested for functionality. The performance parameters are documented. These include, for example, sensitivity, threshold, conversion factor and scale offset. A decision block 158 determines if functionality of the probe 24 is acceptable. If not, the probe assembly is reworked at a block 160 and the operation returns to the block 158. If the functionality is acceptable, then the probe parameters are written to the probe memory 72 at a block 162. The calibration fixture reads back the probe parameters at a block 164 and determines at a decision block 166 if the parameters match. If not, then the operator is prompted that the probe memory write failed at a block 168 and the operation returns to the block 160. If the parameters match, then the operation rechecks the probe performance and memory at a block 170 and then determines if it is acceptable at a decision block 172. If not, then the operation returns to the block 160. If so, then the calibration routine ends at the node 174.

Thus, as described herein, a magnetostrictive sensing instrument allows the transmitter to be removed from the probe and to be used with a different probe by providing for automatic calibration of the probe to the transmitter and uses a preamplifier in the probe to allow for remote mounting of the transmitter relative to the probe.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A magnetostrictive sensing instrument comprising:
   a probe including an elongate tube having a near end and a distal end, a magnetostrictive wire in the tube, and an adapter at the tube near end including a probe circuit comprising a drive circuit for the magnetostrictive wire, a pickup sensor and a preamplifier circuit;
   an instrument housing including a control circuit; and
   a two part connector assembly operatively disposed between the instrument housing and the adapter comprising a probe connector and a transmitter connector for mechanically connecting the probe to the instrument housing, the transmitter connector comprising electrical connectors electrically connected to the control circuit and the probe connector comprising electrical connectors electrically connected to the probe circuit.

2. The magnetostrictive sensing instrument of claim 1 wherein interaction between an electrical pulse on the magnetostrictive wire from the drive circuit and a magnetic field produces a torsional wave on the magnetostrictive wire sensed by the pickup sensor and the preamplifier circuit amplifies a signal from the pickup sensor for transmission to the control circuit.

3. The magnetostrictive sensing instrument of claim 1 wherein the connector assembly further comprises an elongate conduit for remotely mounting the instrument housing relative to the probe.

4. The magnetostrictive sensing instrument of claim 1 wherein the connector assembly comprises a swivel connector.

5. The magnetostrictive sensing instrument of claim 1 wherein the preamplifier circuit amplifies and filters a signal from the pickup sensor.

6. The magnetostrictive sensing instrument of claim 1 wherein the control circuit is operable to determine if the probe is connected to the control circuit.

7. A magnetostrictive sensing instrument comprising:
   a probe including an elongate tube having a near end and a distal end, a magnetostrictive wire in the tube, and an adapter at the tube near end including a probe circuit comprising a drive circuit for the magnetostrictive wire, a pickup sensor and a preamplifier circuit;
   an instrument housing including a control circuit; and
   a connector operatively disposed between the instrument housing and the adapter and comprising electricial conductors for connecting the control circuit to the probe circuit, wherein the probe circuit comprises a memory circuit storing calibration parameters for the probe.

8. A magnetostrictive sensing instrument comprising:
   a probe including an elongate tube having a near end and a distal. end, a magnetostrictive wire in the tube, and an adapter at the tube near end including a probe circuit comprising a drive circuit for the magnetostrictive wire, a pickup sensor and a memory circuit storing calibration parameters for the probe;
   an instrument housing including a control circuit; and
   a connector operatively disposed between the instrument housing and the adapter and comprising electrical conductors for connecting the control circuit to the transceiver circuit.

9. The magnetostrictive sensing instrument of claim 8 wherein the connector comprises a removable connector for removing the instrument housing from the probe.

10. The magnetostrictive sensing instrument of claim 8 wherein the probe circuit comprises a preamplifier circuit.

11. The magnetostrictive sensing instrument of claim 8 wherein the control circuit is operable to read calibration parameters from the memory.

12. The magnetostrictive sensing instrument of claim 11 wherein interaction between an electrical pulse on the magnetostrictive wire from the drive circuit and a magnetic field produces a torsional wave on the magnetostrictive wire sensed by the pickup sensor and the calibration parameters are used for analyzing the torsional wave.

13. The magnetostrictive sensing instrument of claim 8 wherein the control circuit is operable to determine if the probe comprises a new probe and responsive thereto reads calibration parameters from the memory.

14. The magnetostrictive sensing instrument of claim 8 wherein the memory circuit is write protected.

15. A method of calibrating a magnetostrictive sensing instrument comprising:

providing a probe including an elongate tube having a near end and a distal end, a magnetostrictive wire in the tube, and an. adapter at the tube near end including a probe circuit comprising a drive circuit for the magnetostrictive wire, a pickup sensor and a memory circuit storing calibration parameters for the probe;

providing an instrument housing including a programmed controller;

operatively connecting the instrument housing to the adapter for connecting the controller to the probe circuit; and the controller reading the calibration parameters from the memory circuit and subsequently using the calibration parameters during normal measurement operations.

16. The method of claim 15 wherein during normal measurement operation interaction between an electrical pulse on the magnetostrictive wire from the drive circuit and a magnetic field produces a torsional wave on the magnetostrictive wire sensed by the pickup sensor and the calibration parameters are used for analyzing the torsional wave.

17. The method of claim 15 wherein the controller determine if the probe comprises a new probe and responsive thereto reads calibration parameters from the memory.

18. The method of claim 15 wherein the memory circuit is write protected.

19. The method of claim 15 further comprising a probe calibration operation comprising connecting the probe to a calibration fixture which tests performance operation of the probe and determines the calibration parameters and writes the calibration parameters to the memory circuit.

20. The method of claim 15 further comprising a power up routine which compares the calibration parameters in the memory circuit to calibration parameters in the controller to determine if a new probe is detected.

* * * * *